United States Patent [19]

Sabatino et al.

[11] Patent Number: 5,688,183
[45] Date of Patent: Nov. 18, 1997

[54] VELOCITY MONITORING SYSTEM FOR GOLF CLUBS

[76] Inventors: Joseph Sabatino, 1821 Saxon La., Maple Glen, Pa. 19002; Adelbert M. Gillen, 1 Cornwell Dr., Solebury, Pa. 18938; Amir Makki, 2500 Belmont Ave., Apartment A409, Philadelphia, Pa. 19131

[21] Appl. No.: 409,883

[22] Filed: Mar. 21, 1995

(Under 37 CFR 1.47)

Related U.S. Application Data

[63] Continuation of Ser. No. 887,020, May 22, 1992, abandoned.

[51] Int. Cl.⁶ .................................................... A63B 69/36
[52] U.S. Cl. ........................ 473/212; 473/209; 473/221
[58] Field of Search .................................. 473/213, 212, 473/209, 207, 221

[56] References Cited

U.S. PATENT DOCUMENTS

| | | | |
|---|---|---|---|
| 3,717,857 | 2/1973 | Evans | 273/186.2 |
| 3,788,647 | 1/1974 | Evans | 273/186.2 |
| 3,945,646 | 3/1976 | Hammond | 273/186.2 |
| 4,515,368 | 5/1985 | Pititjean | 273/186.2 |
| 4,652,141 | 3/1987 | Arai | 368/278 |
| 4,699,379 | 10/1987 | Chateau et al. | 273/187.2 |
| 4,761,835 | 8/1988 | Chen | 2/160 |
| 4,766,611 | 8/1988 | Kim | 2/160 |
| 4,788,863 | 12/1988 | Tanaka | 273/186.2 |
| 4,852,875 | 8/1989 | McLennan et al. | 273/186.2 |
| 4,991,850 | 2/1991 | Wilhelm | 273/186.2 |

FOREIGN PATENT DOCUMENTS

| | | | |
|---|---|---|---|
| 4141186 | 5/1992 | Japan | 273/186.2 |
| 4146770 | 5/1992 | Japan | 273/186.2 |
| 2236682 | 4/1991 | United Kingdom | 273/186.2 |
| 1006348 | 5/1991 | WIPO | 273/186.2 |

OTHER PUBLICATIONS

Habbeler, R.C., Dynamics $2^{nd}$ Ed., 1978, pp. 421–438 and 444–452.

*Primary Examiner*—Raleigh W. Chiu
*Assistant Examiner*—Michael O'Neill
*Attorney, Agent, or Firm*—Oldham & Oldham Co., LPA

[57] ABSTRACT

A golf club head velocity monitor is disposed at or near the golfer's hands. The monitor is preferably detachably securable to the golfer's hands or a golf glove, so that a single monitor can easily be used with any club selected by the golfer. An inferential determination of club head velocity may be made from the output of a single accelerometer disposed to measure centripetal acceleration in the direction of the golf club shaft. The monitor may provide other functions such as timekeeping or scorekeeping functions.

6 Claims, 3 Drawing Sheets

VELOCITY MONITORING SYSTEM FOR GOLF CLUBS

This is a continuation of application Ser. No. 07/887,020 filed on May 22, 1992, now abandoned.

FIELD OF THE INVENTION

This invention relates to determination of characteristics of a sporting implement, such as a golf club, when swung. More particularly, this invention relates to a method and apparatus for monitoring the velocity of a golf club head by means which need not be permanently associated with the golf club. This invention also relates to accessories which may be secured to a golf glove during play.

BACKGROUND OF THE INVENTION

It is known that the flight of a struck golf ball is determined in part by the velocity of the golf club head at the time of impact between the club head and the ball, as well as the characteristic of the club head and the ball, the orientation of the club head with respect to the ball, and factors operating on the ball in flight such as wind. Of these factors, essentially three are variable under control of the golfer—the club head characteristics, determined by the club selected by the golfer, and the club head velocity and orientation at impact. Upon selection of an appropriate club and stance for a particular shot, the success of the golfer in executing the shot is largely a matter of controlling the club head velocity at impact.

Others have sought to measure club head velocity for instructional purposes for a variety of means. Some have developed large, fixed systems which are unsuited to making measurements during ordinary play. Others have developed small, ground mounted, battery operated devices which measure club head speed and swing tempo using light beams. Others have developed systems in which the golf club head itself is instrumented. Examples of such instrumented golf club heads include U.S. Pat. No. 4,940,236 issued Jul. 10, 1990 to Allen, and U.S. Pat. No. 4,991,850 issued Feb. 12, 1991 to Wilhlem. However, such systems require instrumentation of each golf club head in a set, which is expensive, and such instrumentation may undesirably alter the characteristics of the golf club.

SUMMARY OF THE INVENTION

It is therefore an object of the invention to provide a system for golf club head velocity monitoring, and for monitoring the motion of other sporting implements, which avoids the aforementioned drawbacks of prior art systems. Instead of instrumenting the club head of each golf club in a set, the present invention employs a sensor which may be temporarily associated with each club in a set while it is in use. In order to facilitate use of the system and avoid interference with the swinging characteristics of each golf club, the sensor of the present invention is disposed near the golfer's hands during swinging. The sensor provides an output which is responsive to its movement, from which an inferential determination of golf club head velocity may be made. By using the method and apparatus of the present invention, the same means may be used to determine club head velocity for any club selected, and standard clubs may be used without any modification being necessary to enable the determination. Club head velocity may be determined in the ordinary course of the golfer's play.

Preferably, the velocity-determining golfing aid of the invention is easily and conveniently associated with a selected club in a manner which does not materially alter or interfere with the golfer's ordinary swinging movements. Accordingly, the velocity measuring apparatus of the present invention is preferably embodied as a small, lightweight, self-contained device. Such a device may be secured for instance to a golfer's hands in the manner of a wristwatch, or may be secured to a standard golf glove in place of the ordinarily supplied ball-marking button, or may be secured to the golf club shaft in the vicinity of the grip.

The present invention entails the use of one or more sensors from which club head velocity measurements may be inferred, which are disposed in a substantially fixed relationship to the golf club during a swing to be monitored. The sensors are preferably acceleration sensors. One sensor is preferably disposed to measure the centripetal acceleration along the shaft of the golf club; other sensors, if present, are preferably disposed to measure acceleration in a plane which is generally perpendicular to the golf club shaft. Using two or more sensors, the club face orientation and/or direction of motion at impact with a ball may be determined.

It is another object of the invention to provide the golfer or other user of a swung sporting implement with a convenient, light weight chronometer or timepiece which does not restrict or adversely affect the user's sporting activities. In accordance with this aspect of the invention, the same circuitry which provides motion information may be used to provide a watch function. Other objects and features of the invention will be understood with reference to the following specification and claims and the drawings.

DETAILED DESCRIPTION

Figure 1:
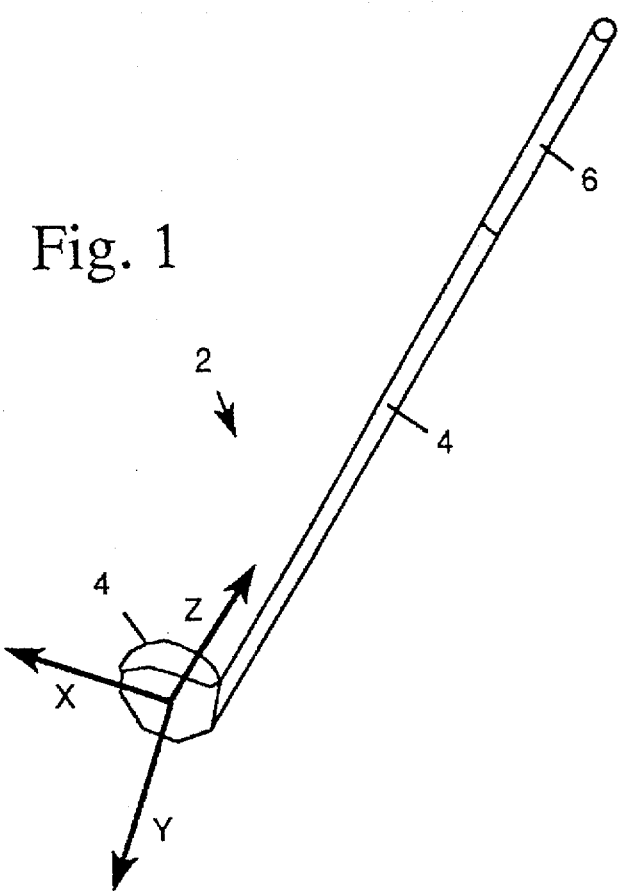
FIG. 1 is a perspective illustration of a golf club, indicating the direction conventions used in the description and drawings.

FIG. 1 is a perspective illustration of a golf club, indicating direction conventions used in the description and drawings. A golf club 2 includes a shaft 6 having a club head 4 secured at one end thereof and a grip 8 secured at the other end thereof. A Z axis lies in the direction of the golf club handle 6. A pair of mutually perpendicular X and Y axes define an X-Y plane which is generally perpendicular to the Z axis. The Y axis as illustrated is the axis of movement of the golf club head during normal swinging.

When a golf club is swung, the club head follows a curved path about two connected centers of rotation. A first center of rotation is located generally between the golfer's shoulders. A second center of rotation is formed by the golfer's wrists. At the time when the club head strikes the golf ball, as the golfer breaks his wrist, the club head is generally aligned with the centers of rotation, and the direction of motion of the golfer's hands is generally parallel to the direction of motion of the club head.

A motion sensor disposed between the centers of rotation, e.g. between the shoulders and wrists, will not respond to motion about the second center of rotation. A sensor disposed between the second center of rotation and the club head will respond to motions about both centers of rotation. A golf club-mounted sensor will experience the greatest motion if mounted on the club head, and this location will provide a given sensor with the largest signal output and consequent measurement accuracy. However, the prior art acknowledges the problems of disposing a sensor on the club head, including affecting the club's swing characteristics. E.g. Allen U.S. Pat. No. 4,940,236 at column 1 line 59-column 2 line 10.

Figure 2:
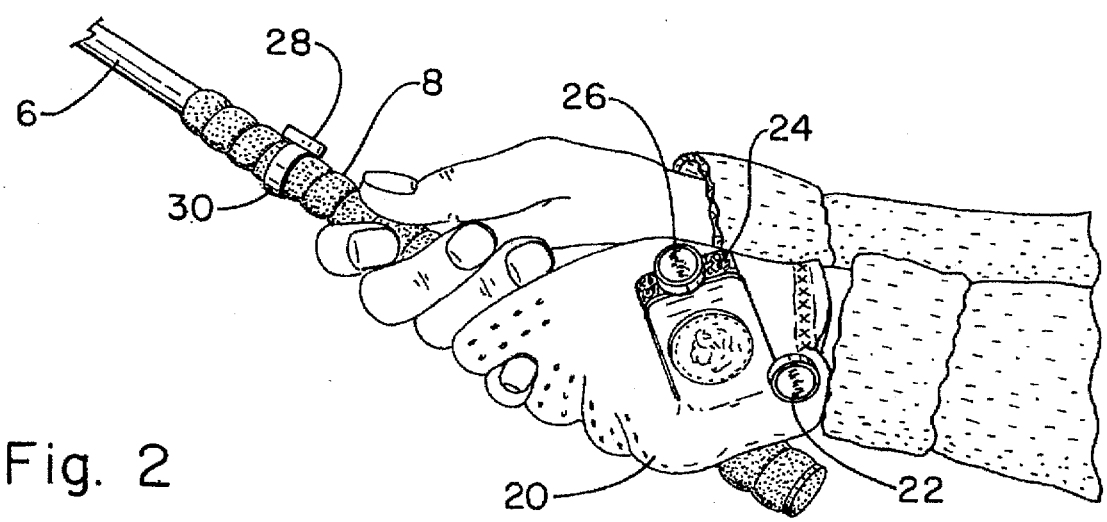
FIG. 2 is an illustration of a golf club handle being gripped by a golfer, showing various mounting locations for the device of the invention.

It has been discovered that a device including a sensor may be disposed, not at the club head, but generally at the grip end of the club, and provide an inferential determination of club head velocity which is sufficiently accurate and repeatable to be useful for many purposes. FIG. 2 is an illustration of a golf club grip being gripped by a player's hands, showing locations where such a device may be disposed.

In FIG. 2, a device 22 is shown secured to a golf glove 20 in the location where a ball-marking button is typically provided. For mounting in this location, the device 22 may be provided on its bottom side with one half of a snap closure of the type typically provided on ball-marking buttons, so that the device may be substituted for such a button on a golf glove by snapping it in place.

Another alternative mounting location also shown in FIG. 2 is that of device 26. The golf glove 20 typically includes a closure or size adjustment mechanism including mating pieces of material such as that sold under the trademark Velcro. A portion 24 of such Velcro is exposed on the back of the glove 20, and a device 26 for mounting at this location may be provided on its bottom side with a mating Velcro portion so that the device 26 may be detachably secured to the glove 20.

A third alternative mounting location is also shown in FIG. 2, where a device 28 is secured to grip 8 of the golf club. It will be understood that device 28 might also be mounted to the shaft 6. Device 28 is secured to grip 8 by a securing means 30, which may include a band encircling the grip 8, a spring clip which partially encircles grip 8, or many other means.

Other device mounting locations and mounting means may also be provided. For instance, a device may be mounted to a finger in the manner of a ring. The device may also be mounted to a wrist in the manner of a wrist watch.

Each mounting location for a device including a sensor has certain relative advantages and disadvantages. Glove or hand mountings are simplest to use because the device, once mounted, will always be in place for measuring a swing with any club. Such locations inherently entail some variability in sensor-club relative positioning, since a golfer is unlikely to grip a club in exactly the same way every time. For accuracy, locations closer to the club head and more secure mounting means are preferred. For these reasons the grip or shaft location of sensor 28 would be preferred; however, such locations would require either a device 28 secured to every club in a set, which is expensive but would provide reliability, repeatability, and convenience, or that the golfer move the device 28 from club to club, which is less expensive but less convenient.

Figure 3:
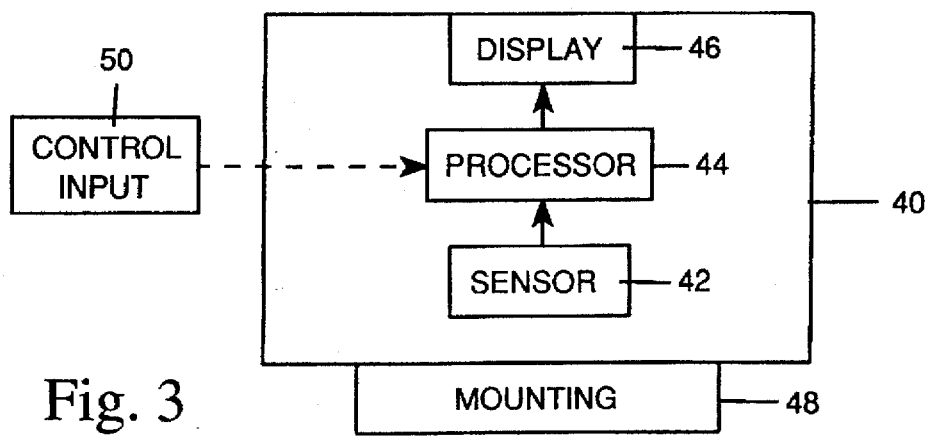
FIG. 3 is a block diagram illustrating the major functional components of a device according to the present invention.

FIG. 3 is a block diagram showing the major functional components of a device according to the present invention. A motion-responsive sensor 42 is disposed within a housing 40. The raw sensor output will typically require processing and conversion to enable output of information representing determined club head velocity, and so the output of the sensor is coupled to a processor 44 for these purposes. Processor 44 controls an externally perceivable output, preferably a visual display 46, for providing club head velocity information to the golfer. Other outputs, such as a synthesized speech output, may also be used.

Means for associating the sensor housing with a golf club to be swung for movement therewith are also provided, shown as mounting 48. The particular means selected for mounting 48 will depend on the location intended for mounting, and as discussed above may include a snap closure portion, a Velcro portion, or a mounting in the nature of a watch band or ring. Mounting means 48 is preferably physically disposed on the opposite side of housing 40 from the display 46, so as not to interfere with the output function. A control input(s) 50 may be provided to processor 44. Such inputs may be provided for the purpose of instructing the device that a swing is to be made, to reset the device after a swing, to provide input parameters to calibrate the device or customize its output for a particular golfer or club, and the like. Such an input 50 may physically take the form of a switch such as customarily provided for setting digital watches. In this regard, it is noted that the device of the present invention may provide other functions in addition to golf club head velocity determination. For instance, processor 44 may include a clock function, the time output of which may be displayed on display 46 together with or alternately with the club head velocity. Thus the device may function as a golf watch, which is often desirable in itself to avoid damage to expensive dress watches which are more appropriately worn on occasions other than golfing. A watch function is preferably provided, and control inputs 50 may function to set the time. If only a single display is provided, control inputs 50 may function to switch the device between its watch and club head monitoring functions. This may also be accomplished automatically, for instance by converting from a watch function to a club monitoring function when a motion threshold has been exceeded, and returning the display to a time display after a predetermined interval. Other functions, such as scorekeeping functions, may also be incorporated into processor 44 with necessary inputs provided by control input 50 and with outputs displayed on display 46. In a particularly preferred embodiment, the device may automatically keep score by maintaining a cumulative and/or per-hole record of the number of club swings or ball impacts.

A variety of sensor technologies may be employed to make the inferential club head velocity determination of the present invention. Sensors which respond directly to their speed of movement, such as air pressure sensors, may be employed. However, it is believed preferable to use acceleration sensors, particularly monolithic accelerometers such as the Analog Devices type ADXL-50.

Figure 4:
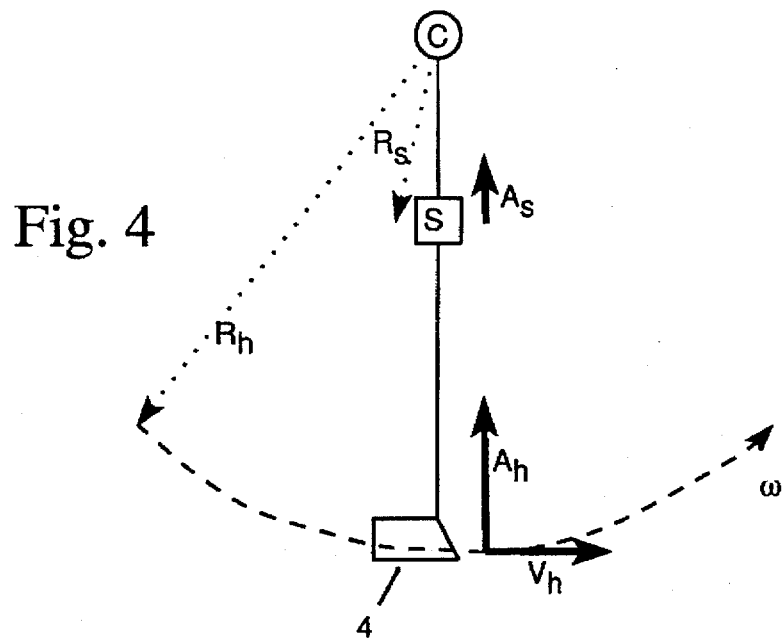
FIG. 4 is a schematic representation illustrating the geometry of club head velocity determination by centripetal acceleration measurement.

When acceleration sensors are used, their outputs may be processed by time integration to determine club head velocity at impact. However, applicant has discovered a particularly preferred mode of using an accelerometer in this application. For a body moving in an arc, its speed at a point may be determined from its angular velocity at that point, and its angular velocity at that point may be determined from its centripetal acceleration. FIG. 4 illustrates the geometry of such a situation.

The golf club head 4 effectively moves in a circular arc, or an approximately circular arc for sufficiently short arc lengths, about a center of rotation C. The club head 4 is disposed at a radius $R_h$ from the center of rotation, and a sensor S is disposed intermediate these points, at a radius $R_s$. Both club head 4 and sensor S effectively move at angular velocity $\omega$ about the center of rotation.

The sensor S is disposed to measure its radial or centripetal acceleration i.e. its acceleration in the direction of the Z axis indicated in FIG. 1. The angular velocity $\omega$ may then be determined as $\omega = \sqrt{(A_s/R_s)}$. The magnitude of the club head velocity may then be determined as $V_h = \omega R_h = (R_h/\sqrt{R_s})\sqrt{A_s}$. Applicant has tested prototype systems utilizing centripetal accelerometer sensors mounted generally at the locations of devices 26 and 28 in FIG. 2. Accelerometer output signals obtained during club swings were correlated with outputs obtained simultaneously from a Sportech brand golf swing analyzer, which measures club head velocity by providing an array of photodetectors in a base and timing the occlusion of successive detectors by the club head to provide a direct velocity measurement. The correlation was sufficient to expect that useful devices may be made using centripetal acceleration measurements. While the values of $R_h$ and $R_s$ may be measured, it is simpler and more practical to compute the factor $R_h/\sqrt{R_s}$ by correlating acceleration and actual club head velocity measurements.

Figure 5:
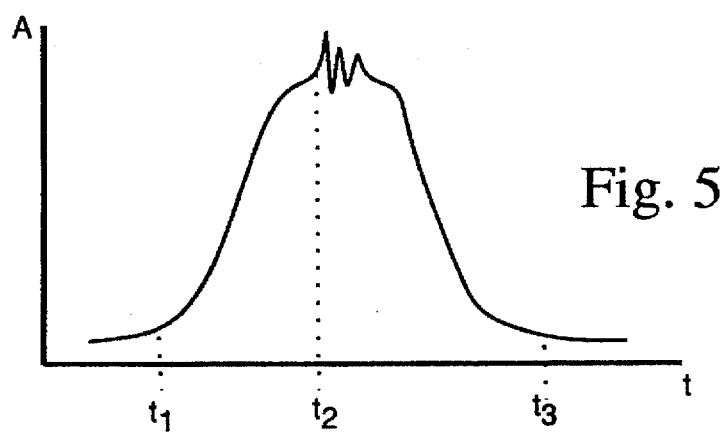
FIG. 5 is a graph illustrating sensor output during a swing.

Sensor motion data will be generated throughout a swing. Since club head velocity at the time of impact with a ball is the information which is desired, a means of determining when impact occurs must be provided. FIG. 5 is a graph illustrating sensor output versus time during a swing. The swing commences at time $t_1$, after which the output increases to a maximum typically at the time of impact $t_2$, after which the output decreases to zero at the time of completion of the swing $t_3$. Typically the impact will cause noise to be superimposed on the sensor output waveform, as illustrated after $t_2$. Two methods may be employed in this situation to determine the sensor output to be employed in club head velocity determination. First, the effects of any such noise may be minimized by appropriate filtering, and the peak sensor output selected as the output representing impact velocity. Second, the occurrence of such noise may be used to determine the time of impact. Thus sensor outputs may be sampled and stored during a swing, and the noise pulse detected such as by differentiation of the sensor output. A sensor output sample taken shortly before the impact time $t_2$ may then be selected as the output representing impact velocity.

Figure 6:
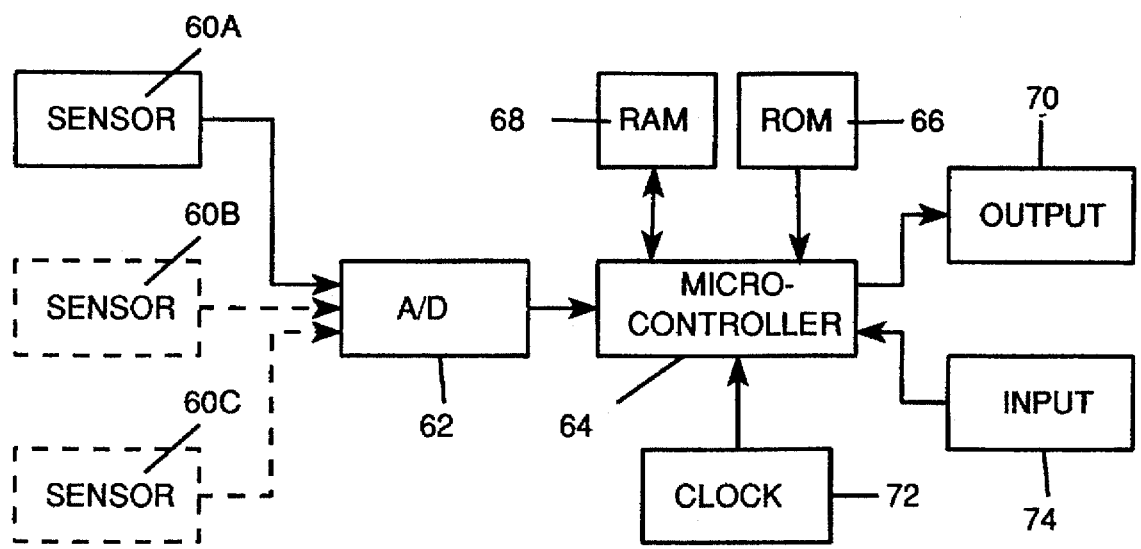
FIG. 6 is a block diagram illustrating the main functional components of a processor which may be used in the invention.

FIG. 6 is a block diagram illustrating the functional signal acquisition and processing components which may be used in a device according to the invention. These components are powered by a battery which is not shown. At least one sensor 60A is provided; one or more additional sensors 60B and/or 60C may also be provided. Such sensors 60 provide an electrical output which is a function of their motion. The sensor blocks 60 shown may include signal conditioning circuitry such as amplifiers. The output of each sensor 60 is supplied to the analog input of an analog-to-digital converter 62, the digital output of which is supplied to low power microcontroller 64. Microcontroller 64 operates on the received sensor data in accordance with a program stored in read-only memory 66. The club head velocity determined by microcontroller 64 is provided to the golfer by output device 70. A system clock 72 is provided to synchronize the operation of microcontroller 64, and if a watch function is included in the device, system clock 72 may control this function. An input 74 to microcontroller 64 is provided for any calibrating, setting, resetting, and the like functions which may be necessary. It will be understood that many of these functional blocks may be provided by a single piece of hardware.

A variety of methods may be employed to inferentially determine club head velocity using a system as shown in FIG. 6. As has been described, a single accelerometer may be disposed to measure centripetal acceleration along the Z axis shown in FIG. 1. A sensor may be disposed to measure movement along the Y axis; if it is an accelerometer, its output may be integrated over the swing period until impact, and if it is a velocity sensor its output may be directly used to determine club head velocity. A pair of sensors may be used. For instance, an acceleration or velocity sensor may measure motion along the Y axis, and a centripetal accelerometer may measure acceleration along the Z axis as described, and their outputs averaged or otherwise combined to reduce measurement error. A pair of sensors may also be used to determine the club direction at impact. For instance, a pair of acceleration or velocity sensors may be disposed to measure in the X-Y plane, for instance at Y+45° and Y-45°. Their outputs may be combined to determine the club head speed at impact, and the difference in their outputs may be used to determine motion in the X direction at impact, i.e. whether the ball will be pushed (inside-out swing) or pulled (outside-in swing). Such a determination may also be made directly by a pair of sensors, one measuring in the X direction and one measuring in the Y direction. An array of three sensors may be disposed to measure in the Z direction and in the X-Y plane to enable virtually complete information regarding club head movement to be inferentially determined. Any such information derived from the sensors may be displayed.

While it is believed preferable to include motion monitoring functions in a device such as have been described, it will be understood that the mounting methods described may be used for other sporting devices without a motion monitoring function. Specifically, a golf or other sporting watch may be provided with snap, Velcro, or like mounting means for mounting at locations 22 or 26 shown in FIG. 2. Such a watch may be provided with a manual scorekeeping function which is operable by a golfer actuating a switch for each stroke.

While particular embodiments of the invention have been shown and described, variations will undoubtedly occur to those skilled in the art without departing from the spirit and scope of the invention.

For instance, the above methods and apparatus may be adapted to measure swing characteristics of sporting implements which are grasped in a user's hands and swung, and which include an object-impacting portion and a grip portion interconnected by a shaft. Such other sporting implements may include racquets such as tennis, racquetball, and squash racquets, bats such as baseball bats, and sticks such as hockey sticks.

What is claimed is:

1. Apparatus for determining the velocity in the Z-plane of a golf club swung by a golfer, said club having a club head and a grip interconnected by a shaft, at the time of club head impact with a golf ball, comprising:

at least one acceleration sensor having an output responsive to its acceleration, said output being computed by a measurement taken before an impact time of the club head with the golf ball, said impact of said club head with said golf ball generating a noise reading which is used to determine a time of impact, a means for detachably securing said sensor to the hands or wrists of said golfer, to a golf gove worn by said golfer, to said grip, or to said shaft adjacent to said grip, and arranged to measure radial acceleration in the Z-plane; and a means utilizing the sensor output for computing and displaying an output representing said club head impact velocity based upon said sensor output, said means defining $R_h$ as the radius of the club head from the center of rotation C, defining $R_s$ as the radius of the sensor from C, and $A_s$ as the output from the sensor, whereby the angular velocity of the club head is $\omega$ and is determined by the formula $\omega = \sqrt{(A_s/R_s)}$, and the speed of the club head ($V_h$) is determined by the formula $V_h = \omega R_h = (R_h/\sqrt{R_s})\sqrt{A_s}$ and $V_h$ is displayed as the sensor output.

2. Apparatus according to claim 1, including a plurality of acceleration sensors, each of which is responsive to acceleration in a different direction.

3. Apparatus according to claim 1, wherein said computing and displaying means includes means for computing and displaying an output representing club head velocity based upon the output of said sensor at a time near said impact.

4. Apparatus according to claim 1, further including means for computing and displaying time.

5. Apparatus according to claim 1, further including means for determining means is responsive to said sensor output.

6. Apparatus according to claim 5, wherein said swing number determining means is responsive to said sensor output.

* * * * *